July 6, 1965          L. REIFFEL          3,193,683
MEASURING SYSTEM USING THE RESONANT ABSORPTION OF GAMMA RAYS
Filed May 23, 1960          2 Sheets-Sheet 1
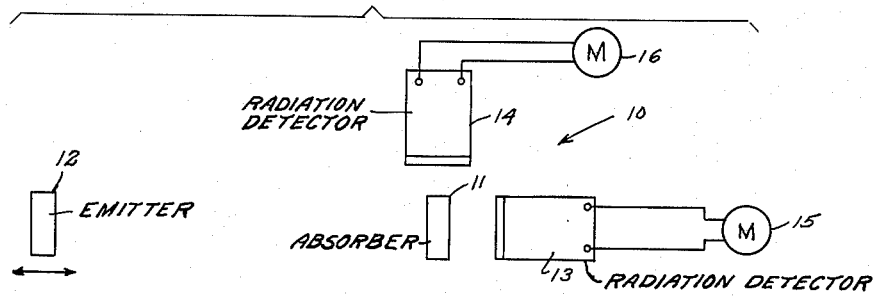
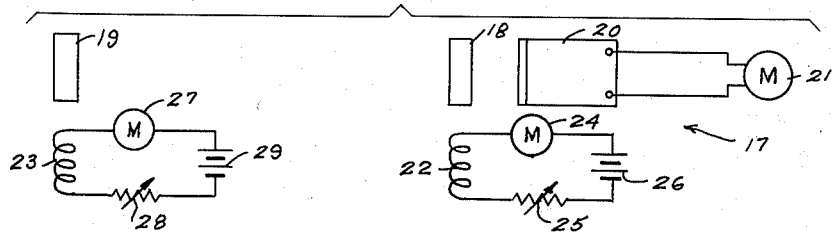
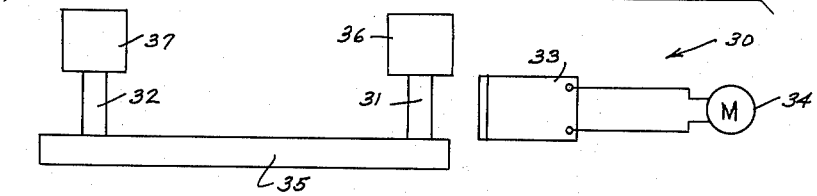
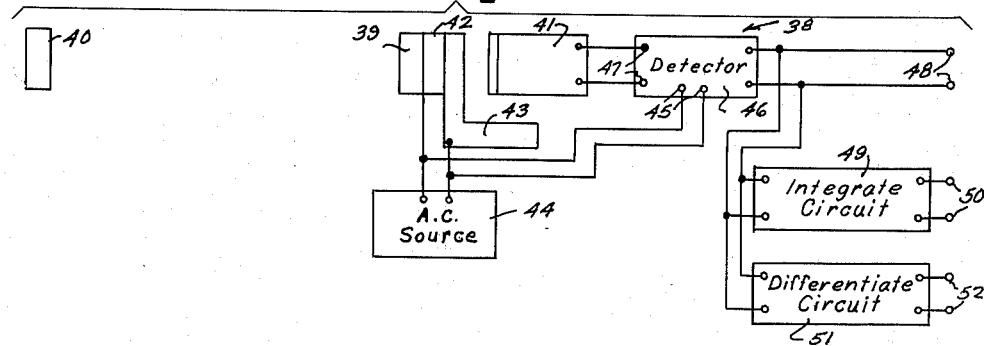
INVENTOR.
Leonard. Reiffel
BY
Hill, Sherman, Meroni, Gross & Simpson
ATTYS.

July 6, 1965  L. REIFFEL  3,193,683
MEASURING SYSTEM USING THE RESONANT ABSORPTION OF GAMMA RAYS
Filed May 23, 1960  2 Sheets-Sheet 2
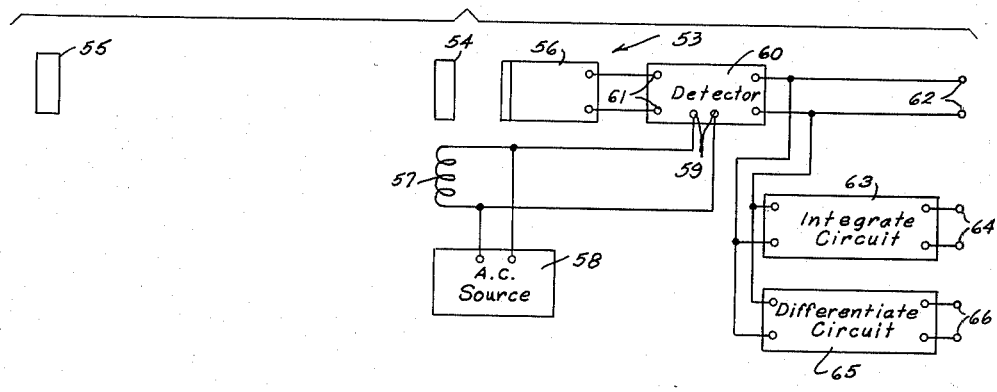
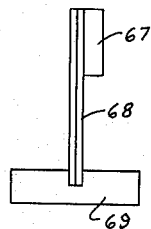
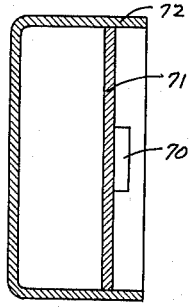
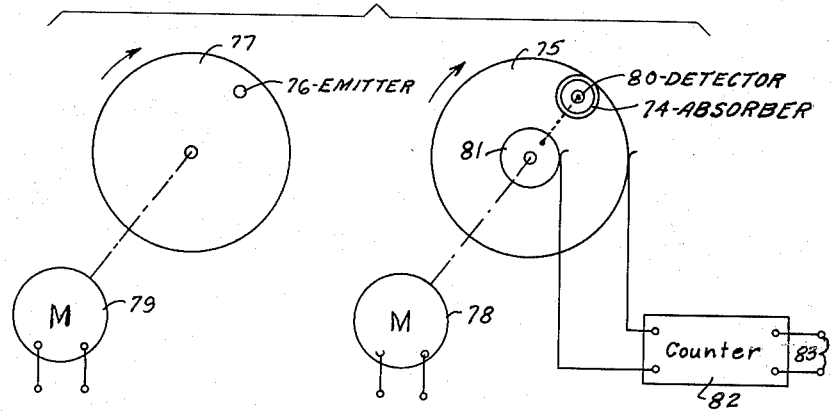
INVENTOR.
Leonard Reiffel
BY
Hill, Sherman, Meroni, Gross & Simpson
ATTYS.

United States Patent Office 3,193,683
Patented July 6, 1965

3,193,683
MEASURING SYSTEM USING THE RESONANT ABSORPTION OF GAMMA RAYS
Leonard Reiffel, Chicago, Ill., assignor to IIT Research Institute, a corporation of Illinois
Filed May 23, 1960, Ser. No. 30,983
18 Claims. (Cl. 250—106)

This invention relates to a measurement system using gamma rays, operative to perform measurements of certain variables with high accuracy and in conditions under which such measurements could not heretofore be performed.

Prior art systems for measuring many variables have had a number of limitations. In some cases, the transducer device used for sensing the variable has created difficulties. In other cases, a severe limitation has arisen in the transmission of information to a measuring instrument from a point at which the variable is sensed. For example, in the measurement of vibrations, conventional transducers create a load on the vibrating member, preventing accurate measurement, and in addition are quite cumbersome. Light, doppler sonic methods and other vibration measuring methods have had limitations with respect to obtaining an unobstructed, uniform path for transmission of information. In addition, the measurement of small variations has been impossible or extremely difficult. In other systems, for example in measurement of temperature, environmental conditions have created severe limitations.

This invention was evolved with the object of providing a system for measuring certain variables with a high degree of accuracy and in conditions under which prior art systems are unsatisfactory.

This invention involves the use of gamma rays which are electromagnetic waves identical in nature to X-rays, but are of higher energy and are more penetrating. Gamma rays are emitted by a reaction that takes place within the nuclei of atoms of various radio-active materials. Such atoms comprise a nucleus surrounded by electrons which travel in orbital shells or rings at various distances from the nucleus. The nucleus comprises nucleons which may be thought of crudely as travelling in orbital rings having diameters much smaller than those of the electron rings. Characteristic X-rays are emitted in response to the removal of an electron from an inner electron ring, followed by the transfer of an electron from an outer ring to the inner ring, with the emanation of electromagnetic wave energy of a certain energy or frequency (energy and frequency being proportional). In a somewhat similar way, gamma rays are emitted in response to rearrangement of the nuclear structure in which a nucleon may be crudely considered to move an outer ring to an inner ring, with the emanation of electromagnetic wave energy of a certain energy or frequency. In general, the energy or frequency of gamma rays is much higher than the energy or frequency of characteristic X-rays.

The packet of gamma radiations sent out as a result of a single transition is termed a "photon." As to a given atom, the transition occurs at an unpredictable moment. However, in a given sample of radio-active material, the overall rate is predictable and it decreases in a predictable fashion as the energy of the sample decreases.

In general, the absorption of gamma rays by a given material is proportional to the thickness and density of the material. However, the absorption of gamma rays may be sharply increased under certain very critical resonant absorption conditions, which are involved in this invention.

Resonant absorption occurs when the energy or frequency of the gamma rays impinged on a material is within a certain very narrow frequency range such as to cause rearrangement of the intra-nucleus structure of atoms within the material. Resonant absorption does not ordinarily occur because of a doppler effect produced by relative movement of the emitting and absorbing nuclei, sufficient to shift the effective energy or frequency out of the required very narrow range. Even with the emitter and absorber stationary, such relative movement occurs due to a recoil effect on the emitting nucleus, resulting in a lowering of the energy or frequency of the emitted rays and a similar recoil effected on the absorbing nuclei, necessitating a higher frequency or energy to produce resonant absorption.

Although resonant absorption does not ordinarily occur, it will occur under certain critical conditions with certain materials in which the nuclei are bound by atomic forces in such a manner as to prevent or minimize the recoil effects. For example, certain crystalline forms of the iron isotope of mass 57 ($Fe^{57}$) may be used. $Fe^{57}$ is produced by the decay of $Co^{57}$ and emits gamma rays with a comparatively low energy (14,000 electron volts).

Even with proper materials, it is found that resonant absorption will occur only if other conditions are within narrow limits. The production of the effect is found to be quite sensitive to relative movement between the emitter and absorber, which produces a doppler effect and a change in frequency. It is also affected by magnetic fields in the vicinity of the emitter or absorber. In addition, the application of stress to the emitter and absorber may affect production of the effect. As a result, it is possible to measure such conditions through the use of the resonant absorption phenomenon.

According to this invention, a measuring system is provided which includes a resonant absorber of such material as to resonantly absorb gamma rays within a very narrow frequency range. A radio-active emitter is effective through intra-nucleus reaction to emit and transmit to the absorber gamma rays having a certain effective frequency at the absorber, and a radiation detector is provided for measuring the absorption of gamma rays by the resonant absorber. The difference between the effective frequency and the mid-frequency of the response range is affected by the relative magnetic field strengths at the emitter and absorber, the relative speed of movement thereof, and relative stress conditions. Temperature also has an effect which may or may not be applicable, depending upon the type of material. With three of such parameters being substantially constant, the fourth may be measured. For example, with the relative temperatures, the relative magnetic field strengths and the relative stress conditions being substantially constant, the system can detect changes in the relative speed of movement of the emitter and absorber. In a similar way, the system can measure changes in relative magnetic fields and in stress conditions.

With this system, it is possible to obtain an extremely high degree of accuracy, under conditions where prior art systems would not be suitable. For example, it is possible to accurately measure velocities in a range from 1 centimeter per second down to 10 microns per second, or even less. The emitter can be extremely compact, and can be disposed in comparatively inaccessible locations, at a considerable distance from the absorber and detector. The gamma rays readily penetrate walls, and have considerable range. They are not affected by changes in the medium between the emitter and absorber such as winds or changes in refractive index which would affect sonic systems, for example.

The possible fields of use of the system are endless. It can be used in any application where it is desired to measure velocity, or a quantity functionally related to velocity, such as distance, acceleration, or any other velocity function. Thus it can be used in measuring precession of gyros, in seismograph work, in machine tool applications, in the measurement of vibrations both continuous and non-continuous, and in acoustics to measure amplitude, frequency, etc.

It can also be used in the direct measurement of temperature, or in the measurement of temperature indirectly, by using a bimetal element to convert temperature changes to movement. Likewise it can be used in the measurement of pressure, and in the measurement of strain.

The system can be used in the direct measurement of stress within the emitter and/or absorber, and can also be used in the indirect measurement of stress, by first converting stress into strain or movement and measuring the movement.

The system has important advantages in the measurement of magnetic fields, in that the emitter can be extremely compact and can be located at a point remote from the absorber and detector.

An important specific feature of the invention is in the provision of means including a phase-sensitive detector for determining the direction of change of a variable being measured.

This invention contemplates other objects, features and advantages which will become more fully apparent from the following detailed disclosure taken in conjunction with the accompanying drawings which illustrate preferred embodiments and in which:

FIGURE 1 is a view illustrating diagrammatically a system constructed according to the principles of this invention, usable for measuring velocity;

FIGURE 2 is a view illustrating diagrammatically a system usable for measuring relative magnetic fields;

FIGURE 3 is a view illustrating diagrammatically a system for measuring relative stress conditions;

FIGURE 4 is a view illustrating diagrammatically a system for automatically obtaining an indication of both the direction and magnitude of a change of a variable, using vibration means in conjunction with a phase detector;

FIGURE 5 is a view illustrating diagrammatically another system for automatically obtaining an indication of both the direction and magnitude of change of a variable, using an alternating magnetic field in conjunction with a phase detector;

FIGURE 6 is a view illustrating diagrammatically the support of a member on a bimetal element, permitting measurement of temperature variations;

FIGURE 7 is a view illustrating diagrammatically the support of a member on a diaphragm, usable in measuring pressure and in acoustics; and FIGURE 8 is a view illustrating diagrammatically a system for measuring variations in relative speeds of rotation.

Referring to FIGURE 1, reference numeral 10 designates a system usable for measuring velocity. The system 10 comprises a resonant absorber 11, a radio-active emitter 12, and radiation detectors 13 and 14 for measuring the absorption of gamma rays by the resonant absorber 11. As illustrated, the outputs of detectors 13 and 14 are connected to meters 15 and 16.

The absorber 11 and the emitter 12 are of such materials that the nuclei thereof are bound into a crystal lattice such that a useful fraction of the nuclear disintegration thereof will lead to emission or absorption at well defined resonant energies or frequencies. For example, the absorber 11 may be of a crystalline form of the iron isotope of mass 57 ($Fe^{57}$) and the emitter 12 may be of the same isotope, activated to emit gamma rays at an energy of about 14,000 electron volts.

In operation, the absorber 11 resonantly absorbs gamma rays within a certain narrow frequency range, and the radio-active emitter 12 is effective to transmit to the absorber 11 gamma rays having a certain effective frequency at the absorber 11. The difference between said effective frequency and the mid-frequency of said narrow range is affected by the relative temperatures and relative magnetic field strengths at the emitter and absorber, the relative speed of movement of the emitter and absorber and relative stress conditions within the emitter and absorber. It may be assumed that the relative temperatures are constant, that the magnetic fields in the regions of the emitter 12 and the absorber 11 are zero or constant, that the members 11, 12 are subjected to zero or constant internal stresses and that they are stationary relative to each other. Under such conditions, and with the proper materials, the effective frequency of the gamma rays at the absorber 11 will be equal to the mid-frequency of the resonant absorption range of the absorber 11. There will be a maximum absorption, and the output of the detector 13, as observed on the meter 15, will be at a minimum. The gamma rays absorbed by the absorber 11 are converted in part into a secondary radiation which is detected by the detector 14, the output of which is observed on the meter 16. Thus under the above conditions, the meter 16 will indicate a maximum output.

Suppose now that the emitter 12 is moved slowly at a constant speed toward or away from the absorber 11, the other conditions remaining the same. This will result in an increase in the reading on the meter 15 and a decrease in the reading on the meter 16. Thus velocity may be measured. To ascertain the actual velocity, the absorber 11 may be moved toward or away from the emitter 12 and its velocity of movement adjusted until a resonant condition is again established, as indicated by the meters 15, 16. The velocity of the absorber 11, required to achieve the resonant condition, may be measured by any suitable means. It will of course be appreciated that the velocity of the absorber 11 may be the unknown factor, and the emitter 12 may be moved to establish a resonant condition, and its velocity measured to ascertain the velocity of movement of the absorber 11.

The system 10 may also be used for measuring temperature, if the relative velocity of the members and other conditions are maintained zero or constant.

It will be appreciated that the absorption of gamma rays by the absorber 11 may be measured either by the detector 13, responsive to gamma rays passed through the absorber, or by the detector 14, responsive to secondary radiation or scattering. It is not necessary to use both. In general, the use of the detector 13, responsive to gamma rays passed through the absorber 11, is preferred.

Referring to FIGURE 2, reference numeral 17 generally designates a modified system constructed according to the principles of this invention, used for measuring relative magnetic fields. The system 17 comprises an absorber 18, an emitter 19, and a detector 20 having its output connected to a meter 21. These may be constructed and may operate in generally the same manner as the absorber 11, the emitter 12, the detector 13 and the meter 15 in the arrangement of FIGURE 1. However, the system 17 is designed to measure magnetic fields, rather than motion. For this purpose, field-producing means in the form of a coil 22 is disposed adjacent the absorber 18 and field-producing means in the form of a coil 23 is disposed adjacent the emitter 19. Coil 22 is connected through a meter 24 and a variable resistor 25 to a battery 26. Similarly, coil 23 is connected through a meter 27 and a resistor 28 to a battery 29.

With no current through coils 22, 23 and with the members 18, 19 stationary and subjected to zero or constant internal stress conditions, a resonant condition may exist and the absorption of gamma rays by the absorber 18 may be at a maximum, the output of the detector 20 as observed on the meter 21 being at a minimum. If, however, the magnetic field in the region of one member is changed without changing the field in the region of the other member, the resonant condition may be partly or totally destroyed, to decrease absorption by the absorber 18 and to increase the output of the detector 20. Suppose, for example, that a field is applied to the emitter 19, by decreasing the resistance of resistor 28 to obtain a certain current flow through the coil 23. The output of the detector 20 will then increase, thus indicating a change in the magnetic field. To ascertain the magnitude of the field, the resistance of resistor 25 may be reduced in value until a sufficient field is applied to the absorber 18 to restore the resonant condition, as indicated by minimum reading of the meter 21. The reading on the meter 24 then indicates the field in the region of the emitter 19. It will be appreciated, of course, that the field to be measured need not be applied from the coil 23, but may be the field developed by any source.

The system may also be used in measuring an unknown field existing at the absorber 18, by adjusting resistor 28 to obtain the resonant condition and noting the reading on the meter 27.

In many cases, the direction of the field to be measured will be unknown and in that case, the position of the coil 22, or the coil 23, may be reversed or the battery polarity may be reversed as through a reversing switch. It should also be noted that the orientation of the field to be measured, and the balancing field, may be changed from the orientation as illustrated, as required in a particular measuring operation.

Referring to FIGURE 3, reference numeral 30 designates another modified system, usable in the measurement of internal stress conditions. The system 30 comprises an absorber 31, an emitter 32 and a detector 33 responsive to gamma rays passed from the emitter 32 through the absorber 31, the output of the detector 33 being connected to a meter 34. These elements are operative in the same general manner as the similar elements of the systems 10 and 17 described above.

As diagrammatically illustrated, the absorber 31 and the emitter 32 are disposed on a support 35 and a pair of blocks 36 and 37 press against the absorber 31 and the emitter 32, to develop internal stresses therewithin.

With equal stresses developed within the absorber 31 and the emitter 32, a resonance condition may be established, other conditions being appropriate, so that the output of the detector 33 will be at a minimum, as observed on the meter 34. If the stress condition within the emitter 32 is changed, for example, as by changing the weight of the block 37, an off-resonant condition may be established. The resonant condition may then be reestablished, by changing the stress condition within the absorber 31, as by changing the weight of the block 36. Accordingly, if an unknown stress is developed within either the absorber 31 or the emitter 32, the magnitude of the stress may be determined by applying a known stress to the other member, sufficient to reestablish the resonant condition.

If desired, the member subjected to the unknown stress may be made as a small integral part of a larger member. For example, the emitter might be integrally embedded within a large block to ascertain stress conditions within the interior of the block.

It should be noted that it is possible to measure a change in a parameter affecting either the emitter or the absorber by making a measurable change in a different parameter affecting the other, to reestablish a resonant condition, provided suitable calibration standards are established. For example, the velocity of the emitter may be measured by applying a measurable magnetic field to the absorber, sufficient to reestablish the resonant condition. In general, however, it is preferable that the same parameters be changed. For example, to measure a velocity, it is preferable that a measurable change be made in the absorber velocity, sufficient to reestablish the resonant condition.

Referring now to FIGURE 4, reference numeral 38 generally designates a system for automatically providing an indication of both the magnitude and the direction of a change of a parameter being measured. The system 38 comprises a resonant absorber 39, a gamma ray emitter 40 and a detector 41 for measuring the gamma rays passed from the emitter through the absorber. The absorber 39 is vibrated to move toward and away from the emitter 40. In particular, absorber 39 is supported on one face of a quartz crystal 42 the opposite face of which is secured on a fixed support 43. An A.C. source 44 is coupled to the crystal 42, to apply an alternating voltage between the opposite faces thereof and to cause it to vibrate in the thickness mode and to cause movement of the absorber 39 toward and away from the emitter 40. The crystal 42 may be provided with suitable electrodes on its opposite faces thereof or the absorber 39 and the support 43 may be used as electrodes.

The A.C. source 44 is connected to one pair of input terminals 45 of a phase detector 46 having a second pair of input terminals 47 connected to the output of the radiation detector 41. The output of the phase detector 46 is connected to a pair of output terminals 48 which may be connected to a meter or any desired form of utilization means.

In operation, the absorber 39 is moved toward the emitter 40 during one phase of the A.C. signal applied from the source 44 and is moved away from the emitter during the opposite phase of the A.C. signal. The phase detector 46 produces an output signal proportional to the net difference between the output of the radiation detector 41 during one phase of the A.C. signal and the output of the radiation detector 41 during the opposite phase of the A.C. signal. If the relative positions of the absorber 39 and the emitter 40 are fixed, if the members are subjected to zero or constant magnetic fields, and if the stress conditions therewithin are zero or constant, the output of the radiation detector 41 during one phase of the A.C. signal will be the same as its output during the opposite phase of the A.C. signal, so that no output voltage will be developed at the output terminals 48. If, however, one of the parameters is changed, a signal will be produced having a polarity corresponding to the direction of the change and having a magnitude proportional to the magnitude of the change. For example, if the emitter 40 is moved slowly away from the absorber 39, the output of the radiation detector 41 will be decreased during the phase of the A.C. signal in which the absorber 39 is moved toward the emitter 40. During the opposite phase of the A.C. signal, in which the absorber 39 is moved away from the emitter 40, the output of the radiation detector 41 will be increased. Thus a net output signal will be developed at the terminals 48, having a certain polarity, and having a magnitude proportional to the velocity of movement of the emitter 40. The system can, of course, be used to measure variables other than velocity.

In many applications, it is desirable to perform integration, differentiation or other operations on the output signal. For this purpose, the output of the phase detector 46 is connected to the input of an integrate circuit 49, the output of which is connected to a pair of output terminals 50, and the output of the phase detector 46 is also connected to the input of a differentiate circuit 51 having its output connected to a pair of output terminals 52. If the system is used for measuring movement of the emitter 40, the output of the integrate circuit 49 provides an indication of distance. Similarly, the output of the differentiate circuit 51 provides an indication of acceleration.

It should be noted that integrating and differentiating circuits may be used without using the phase detector arrangement, in cases where it is not necessary that the system be responsive to the direction of the change in the variable being measured. For example, integrating and/or differentiating circuits may be connected to the outputs of radiation detectors 13, 20 and 33 in the systems of FIGURES 1, 2 and 3.

Referring to FIGURE 5, reference numeral 53 generally designates another system which automatically provides an indication of both the magnitude and direction of change of a parameter being measured. The system 53 comprises a resonant absorber 54, a gamma ray emitter 55 and a detector 56 for measuring gamma rays passed from the emitter 55 through the absorber 54. A field-producing means in the form of a coil 57 is disposed adjacent the absorber 54 and is coupled to an A.C. source 58. Source 58 is also connected to a pair of input terminals 59 of a phase detector 60 having a second pair of input terminals 61 connected to the output of the radiation detector 56. The output of the phase detector 60 is connected to a pair of output terminals 62 and may also be connected to the input of an integrated circuit 63 connected to output terminals 64, and to the input of a differentiate circuit 65 connected to output terminals 66.

The system 53 operates in generally the same manner as the system 38. The phase detector produces an output signal proportional to the net difference between the output of the phase detector 60, during which the coil 57 applies a field in one direction, and the output of the phase detector during the opposite phase of the A.C. signal, during which the coil 57 applies a field of the opposite direction. In this way, an indication is obtained at output terminals 62, indicative of both the magnitude and direction of a change in a variable being measured. The integrate circuit 63 develops at the output terminals 64 a signal proportional to the integrated value of the phase detector output signal over a given length of time. The differentiate circuit 65 develops at the output terminal 66 a signal proportional to the rate of change of the phase detector output signal.

Referring to FIGURE 6, a member 67 is carried on one end of a bimetal strip 68 which is affixed at its other end to a support 69. The member 67 is thus moved relative to the support 69 in response to temperature variations. This movement of the member 67 may be measured by any of the systems described above. For example, the member 67 may be either a resonant absorber or a gamma ray emitter, of a form as described above.

As shown in FIGURE 7, a member 70 is supported on a diaphragm 71, closing the open end of a cup-shaped housing 72. The member 70 is moved in response to changes in pressure on the diaphragm 71. This movement may be measured by any of the systems described above. The member 70 may be either an emitter or a resonant absorber, such as described above. This arrangement may be used in measuring pressure changes, or in acoustic measurements. It will, of course, be appreciated than any variable may be measured by converting it into a movement, a magnetic field change or a stress change, measurable by the systems described above.

Referring to FIGURE 8, reference numeral 73 generally designates a system usable for measuring the relative rotation of a pair of rotating members. In the system 73, a ring-shaped resonant absorber 74 is supported on a wheel 75, the axis of the absorber 74 being parallel to and at a certain distance from the axis of the wheel 75. An emitter 76 is supported in similar fashion on a second wheel 77, rotatable on an axis parallel to that of the axis of wheel 75. The spacing of the emitter 76 from the axis of wheel 77 is the same as the spacing of the axis of absorber 74 from the axis of wheel 75. The wheels 75 and 77 are rotated by suitable means, such as electric motors 78 and 79 as diagrammatically illustrated.

Disposed within the ring-shaped absorber 74 is a detector device 80, one terminal of which is connected to the wheel 75, and the other terminal of which is connected to a slip ring 81, insulated from the wheel 75. The wheel 75 and the slip ring 81 are connected to input terminals of a counter 82 having output terminals 83 which may be connected to any suitable register or utilization means.

In operation, if the wheels 75 and 77 are rotated at precisely the same speed, and with the absorber 74 and emitter 76 in exactly the same relative angular positions, the distance between the emitter 76 and the effective portion of the absorber 74 will always be the same, and a resonant absorption condition may be maintained, the output of the counter 82 being then at a minimum. If however the relative speed should change even slightly, an increased output signal will be developed. The speed of one or the other of the motors 78, 79 may then be adjusted, to reestablish the synchronized movement and obtain the resonant condition. It will be appreciated that the system may be made automatically operative to maintain two members at the same speed, by using a direction and magnitude responsive system such as illustrated in FIGURES 4 and 5. It will be also appreciated that the same principles can be applied in systems in which the movements are other than rotating, for example in systems in which is it desired to maintain two members in synchronized oscillatory movement.

It should be noted that in some cases, and particularly when magnetic fields are applied, there may be more than one narrow frequency range or line at which the resonant absorption may occur. A single resonant absorption line may in effect be split into multiple lines, each with its own direction of polarization of the gamma rays. In such cases, the system may use one particular line or frequency of the split emission pattern and one particular line or frequency of the split absorption pattern, to make the measurement. Accordingly, it should be understood that reference herein and in the claims to use of a narrow frequency range is not to be construed as limited to the use of the main unsplit line or frequency range.

It will be understood that modifications and variations may be effected without departing from the spirit and scope of the novel concepts of this invention.

I claim as my invention:

1. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, three of said parameters being substantially constant and said certain variable being a function of the other of said parameters.

2. In a system for measuring a velocity function of one member relative to another member, a resonant absorber carried by one of said members and of such material as to resonantly absorb gamma rays within a certain narrow frequency range, a radio-active emitter carried by the other of said members and effective through intranucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, said relative temperatures, said relative magnetic field strengths and said relative stress conditions being substantially constant.

3. In a system for measuring the relative magnetic field strengths at two spaced points, a resonant absorber at one of said points of such material as to resonantly absorb gamma rays within a certain narrow frequency range, a radio-active emitter at the other of said points effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, said relative temperatures, said relative stress conditions and the relative positions of said emitter and absorber being substantially constant and fixed.

4. In a system for measuring relative stress conditions, a resonant absorber subjected to stress and of such material as to resonantly absorb gamma rays within a certain narrow frequency range, a radio-active emitter subjected to stress and effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths and said emitter and absorber, the relative speeds of movement of said emitter and absorber and relative stress conditions in said emitter and absorber, said relative temperatures, said relative magnetic field strengths and said relative speed being substantially constant.

5. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, a radiation detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, an A.C. signal source, means coupled to said source and arranged to increase one of said parameters during one phase of the A.C. signal and to decrease said one of said parameters during the opposite phase of the A.C. signal, and a phase detector coupled to said A.C. signal source and to the output of said radiation detector and arranged to produce an output signal proportional to the net difference between the output of said radiation detector during one phase of the A.C. signal and the output of said radiation detector during the opposite phase of said A.C. signal.

6. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, a radiation detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speed of movement of said emitter and absorber and relative stress conditions in said emitter and absorber, an A.C. signal source, electro-mechanical transducer means coupled to said source and mechanically coupled to said absorber for vibrating said absorber to move said absorber toward said emitter during one phase of the A.C. signal and to move said absorber away from said emitter during the opposite phase of said signal, and a phase-sensitive detector coupled to said A.C. signal source and to the output of said detector and arranged to produce an output signal proportional to the net difference between the output of said radiation detector during one phase of the A.C. signal and the output of said radiation detector during the opposite phase of said A.C. signal.

7. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said sorber, a radiation detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, an A.C. signal source, field-producing means coupled to said source arranged adjacent said absorber to produce a field in one direction during one phase of the A.C. signal and a field in the opposite direction during the opposite phase of the A.C. signal, and a phase detector coupled to said A.C. signal source and to the output of said radiation detector and arranged to produce an output signal proportional to the net difference between the output of said radiation detector during one phase of the A.C. signal and the output of said radiation detector during the opposite phase of said A.C. signal.

8. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, a radiation detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber, and relative stress conditions in said emitter and absorber, and A.C. signal source, means coupled to said source and arranged to increase one of said parameters during one phase of the A.C. signal and to decrease said one of said parameters during the opposite phase of the A.C. signal, a phase detector coupled to said A.C. signal source and to the output of said radiation detector and arranged to produce an output signal proportional to the net difference between the output of said radiation detector during one phase of the A.C. signal and the output of said radiation detector during the opposite phase of said A.C. signal, and an integrator circuit connected to the output of said phase detector.

9. In a system for detection of changes in a certain variable, a resonant absorber of such material as to resonantly absorb gamma rays within a certain narrow frequency, a radio-active emitter effective through intra-nucleus reaction to emit and transmit to said absorber gamma rays having a certain effective frequency at said absorber, a radiation detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, an A.C. signal source, means coupled to said source and arranged to increase one of said parameters during one phase of the A.C. signal and to decrease said one of said parameters during the opposite phase of the A.C. signal, a phase detector coupled to said A.C. signal source and to the output of said radiation detector and arranged to produce an output signal proportional to the net difference between the output of said radiation detector during one phase of the A.C. signal and the output of said radiation detector during the opposite phase of said A.C. signal, and a differentiating circuit connected to the output of said phase detector.

10. In a method of measuring, using a resonant absorber of such material as to resonantly absorb gamma rays within a certain narrow frequency range, a radio-active emitter effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber, the relative speeds of movement of said emitter and absorber and relative stress conditions in said emitter and absorber, the steps of making a change in one of said parameters to a certain extent in one direction, then making a change in said one of said parameters to the same extent in the reverse direction, and measuring the differences in the detector outputs obtained during said changes.

11. In a method of measuring, using a resonant absorber member of such material as to resonantly absorb gamma rays within a certain narrow frequency range, a radio-active emitter member effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber members, the relative speeds of movement of said emitter and absorber members, and relative stress conditions in said emitter and absorber members, the steps of moving one of said members toward the other at a certain speed, then moving said one of said members away from the other at a certain speed, and measuring the difference in the detector outputs during said movements.

12. In a method of measuring, using a resonant absorber member of such material as to resonantly absorb gamma rays within a certain narrow frequency range, a radio-active emitter member effective through intra-nucleus reaction to emit and transmit to said absorber gamma rays having a certain effective frequency at said absorber, and a detector for measuring the absorption of gamma rays by said resonant absorber, the difference between said effective frequency and the mid-frequency of said narrow frequency range being affected by certain parameters including the relative temperatures and relative magnetic field strengths at said emitter and absorber members, the relative speeds of movement of said emitter and absorber members, and relative stress conditions in said emitter and absorber members, the steps of effecting a certain change in one direction of the magnetic field applied to one of said members, effecting a certain change in the reverse direction of the magnetic field applied to said one of said members, and measuring the difference in the detector outputs obtained during said changes.

13. In a temperature measuring system, a resonant absorber member of such material as to resonantly absorb gamma rays within a certain narrow frequency range, a radio-active emitter member effective through intra-nucleus reaction to emit and transmit to said absorber member gamma rays having a certain effective frequency at said absorber member, an element supporting one of said members and arranged to move said one of said members in response to temperature changes to change the distance between said members, and a detector for measuring the absorption of gamma rays by said resonant absorber to measure the change in temperature of said element.

14. In a pressure measuring system, a resonant absorber member of such material as to resonantly absorb gamma rays within a certain narrow frequency range, a radio-active emitter member effective through intra-nucleus reaction to emit and transmit to said absorber member gamma rays having a certain effective frequency at said absorber member, means supporting one of said members and arranged to move said one of said members in response to pressure changes to change the distance between said members, and a detector for measuring the absorption of gamma rays by said resonant absorber members to measure changes in said pressure.

15. In a system for measurement of relative movements of a pair of members, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, said absorber being supported on one of said members for cyclic movement in a certain path, said emitter being supported on the other of said members for cyclic movement in a path similar to said certain path, and a detector for measuring the absorption of gamma rays by said resonant absorber to compare the relative movement of said absorber and emitter.

16. In a system for measuring relative rotation of a pair of members a resonant absorber of such material as to resonantly absorb gamma rays within a certain narrow frequency range, a radio-active emitter effective through intra-nucleus reaction to emit and transmit to said absorber gamma rays having a certain effective frequency at said absorber, said absorber being supported on one of said members at a certain distance from the axis of rotation thereof, said emitter being supported on the other of said members at said certain distance from the axis of rotation thereof, and a detector for measuring the absorption of gamma rays by said resonant absorber to compare the relative rotations of said members.

17. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, a detector for measuring the absorption of gamma rays by said resonant absorber to respond to differences between said effective frequency and the mid-frequency of said narrow frequency range, and means responsive to the output of said detector including a differentiating circuit.

18. In a system for detection of changes in a certain variable, a resonant absorber of such material as to resonantly absorb gamma rays within a certain narrow frequency range, a radio-active emitter effective through intra-nucleus reaction to emit and transmit to said absorber gamma rays having a certain effective frequency at said absorber, a detector for measuring the absorption of gamma rays by said resonant absorber to respond to differences between said effective frequency and the mid-frequency of said narrow frequency range, and means responsive to the output of said detector including an integrating circuit.

References Cited by the Examiner

UNITED STATES PATENTS 2,890,345 7/59 Muffly _____ 250—106
2,938,118 5/60 Martin _____ 250—43.5

(Other references on following page)

UNITED STATES PATENTS

| | | | |
|---|---|---|---|
| 2,952,503 | 9/60 | Becker | 250—106 |
| 2,996,620 | 8/61 | Bockenmuehl | 250—83.3 |
| 3,024,364 | 3/62 | Wanetick | 250—83.3 |

OTHER REFERENCES

Temperature-Dependent Shift of Gamma Rays Emitted by a Solid, Josephson et al., Physical Review Letters, vol. 4, April 1, 1960, pages 341 to 342.

Resonant Absorption of the 14.4 Kev. Gamma Ray From $0.10 \times 10^{-6}$, see Fe 57, by Pound et al., Physical Review Letters, vol. 3, Dec. 15, 1959, pages 554 to 556.

Apparent Weight of Photons, by Pound et al., Physical Review Letters, vol. 4, April 1, 1960, pages 337 to 341.

Recoilless Resonance Absorption of Gamma Rays in Fe 57, by Schiffer et al., Physical Review Letters, vol. 3, Dec. 15, 1959, pages 556 to 557.

RALPH G. NILSON, *Primary Examiner*.